United States Patent [19]

Tsujimura et al.

[11] Patent Number: 5,586,197
[45] Date of Patent: Dec. 17, 1996

[54] IMAGE SEARCHING METHOD AND APPARATUS THEREOF USING COLOR INFORMATION OF AN INPUT IMAGE

[75] Inventors: Kazuko Tsujimura, Kawasaki; Yuichi Bannai, Koganei, both of Japan

[73] Assignee: Canon Kabushiki Kaisha, Tokyo, Japan

[21] Appl. No.: 300,488

[22] Filed: Sep. 2, 1994

[30] Foreign Application Priority Data

Sep. 2, 1993 [JP] Japan ................................. 5-218462

[51] Int. Cl.⁶ .................................................. G06K 9/00
[52] U.S. Cl. ............................................. 382/162; 382/305
[58] Field of Search ........................................ 382/162, 165, 382/305, 306; 358/403, 524; 364/282.1, 419.19, 526, 974, 974.6; 395/51, 600, 934; G06F 15/40, 15/401

[56] References Cited

U.S. PATENT DOCUMENTS

| | | | |
|---|---|---|---|
| 4,685,068 | 8/1987 | Greco, II et al. | 364/518 |
| 4,931,929 | 6/1990 | Sherman | 364/401 |
| 5,335,084 | 8/1994 | Munemasa et al. | 358/403 |

FOREIGN PATENT DOCUMENTS

| | | | |
|---|---|---|---|
| 0558054 | 9/1993 | European Pat. Off. | G06F 15/401 |
| 62-279468 | 12/1987 | Japan | G06F 15/40 |
| 5-158999 | 6/1993 | Japan | G06F 15/40 |
| 5-274372 | 10/1993 | Japan | G06F 15/40 |
| 5-290094 | 11/1993 | Japan | G06F 15/40 |

OTHER PUBLICATIONS

Fundamentals of Interactive Computer Graphics, James D. Foley and Andries Van Dam, Intensity and Color, "Color Models For Raster Graphics", pp. 612–620, Addison–Wesley Publishing Company, 1982.

*Primary Examiner*—Leo Boudreau
*Assistant Examiner*—Andrew W. Johns
*Attorney, Agent, or Firm*—Fitzpatrick, Cella, Harper & Scinto

[57] ABSTRACT

A control unit controls an image searching system which performs a high quality search for a desired image in an image database by using color information. A sample image determined by an operator is used as a key to the search, and is input to a sample image input unit. A sample color information extraction unit extracts HSV color space data from the sample image, and an image color information extraction unit extracts HSV color image data from a plurality of images stored in the image database. A contribution factors deciding unit decides a contribution factor for each component in the HSV color space, and a candidate image deciding unit calculates a similarity between the plurality of images stored in the database and the sample image. Image candidates are determined based on the calculated similarity, and the image candidates are displayed on a display unit. The desired image is then selected from the displayed image candidates.

22 Claims, 9 Drawing Sheets

IMAGE SEARCHING METHOD AND APPARATUS THEREOF USING COLOR INFORMATION OF AN INPUT IMAGE

BACKGROUND OF THE INVENTION

The present invention relates to an image processing method and apparatus and, more particularly, to a method to search for an image in an image database, and the apparatus capable of employing the method.

As one of the conventional methods to search for a necessary image out of an image database, there is a method in which an operator makes an example of the desired image, and that the search is performed with reference to color information of the image. The color information is extracted from the desired image by using a color perception space which is composed of three elements, namely, hue, chromaticity, and luminance (altogether, called 'the three attributes of colors', hereinafter). Then, similarity between the extracted color information of the desired image and color information extracted from an image stored in the image database by employing the same color perception space, is examined. Thereby, the order of image candidates, which can be the same as, or which can be similar to the desired image made by the operator, is decided based on the similarity. The image candidate which has a higher similarity is more likely similar to the desired image. Then the images are displayed in order of similarity.

Regarding color data, each contribution factor of the three attributes of color differs in accordance with values of the three attributes of colors. For instance, in a color which has low chromaticity that is close to black or white, and low luminance, a contribution factor of hue which is an attribute to distinguish the difference of color, such as red, blue, and yellow, is also low. If the degree of similarity is calculated on the assumption that the contribution factors of the attributes are the same for all the colors in spite of the aforementioned fact that the contribution factors actually differ, the searching quality becomes lower since low contribution values are included in the calculation of similarity.

SUMMARY OF THE INVENTION

The present invention has been made in consideration of the above situation, and has as its object to provide an image processing method and apparatus which make the quality of search higher by referring to color information when an image is searched out of the image database, and which make it easier for an operator to search for the desired image.

According to the present invention, the foregoing object is attained by providing an image searching method for searching an image database by using color information containing a plurality of color components, comprising a contribution factor calculation step of calculating a contribution factor of each color component of the color information on the basis of the color information, a similarity calculation step of calculating similarity between the color information and a plurality of predetermined color information based on the contribution factor of each color component of color information, and a sorting step of sorting color information corresponding to similarity in order of similarity, and of displaying images.

According to the present invention, another object is attained by providing an image database searching method which searches for an image from the image database by using color information, comprising a generating step of generating a sample image including color information, a contribution factor calculation step of calculating a contribution factor of color information based on the color information of the sample image, a similarity calculation step of calculating similarity between the sample image containing the color information and respective images from an image database, according to the contribution factor, and a displaying step of displaying images from the image database on a display means in order of similarity.

According to the present invention, a further object is attained by providing an image database searching apparatus comprising contribution factor calculation means for calculating a contribution factor of each color component of color information on the basis of the color information, degree of similarity calculation means for calculating similarity between the color information and a plurality of predetermined color information based on the contribution factor of each color component of color information, and display means for sorting color information corresponding to similarity in the order of similarity, and displaying images, wherein the apparatus searches for images by using color information containing a plurality of color components.

According to the present invention, a further object is attained by providing an image searching apparatus comprising generating means for generating a sample image including color information, contribution factor calculation means for calculating a contribution factor of color information based on the color information of the sample image, degree of similarity calculation means for calculating similarity between the sample image containing the color information and respective images from an image database, according to the contribution factor, and displaying means for displaying images from the image database in order of similarity, wherein the apparatus searches for the image from the image database by using color information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

(First Embodiment)

Figure 1:
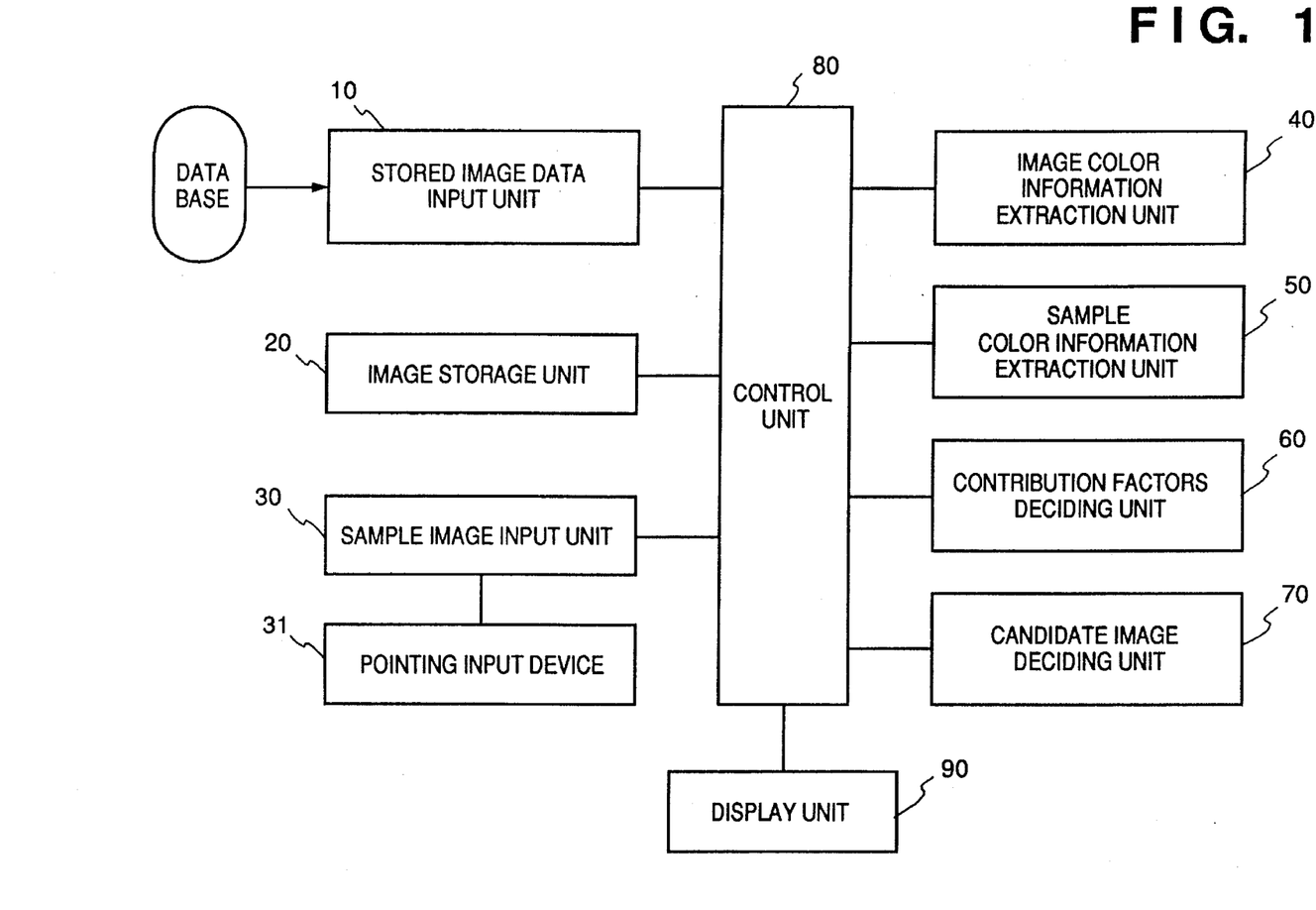
FIG. 1 is a block diagram showing a block diagram of an image searching apparatus in first and second embodiments.

In the first embodiment, a HSV (H stands for hue, S for chromaticity, and V for luminance) color space, for instance, is employed as a color perception space for indicating color data by hue, chromaticity, and luminance. In FIG. 1, reference numeral 10 denotes a stored image data input unit for inputting image data to be stored in database, 20 denotes an image storage unit for storing the image data input at the stored image data input unit 10, and 30 denotes a sample image input unit for inputting a sample image made by an operator to obtain the desired image, where the sample image input unit 30 has a pointing input device 31. Further, an image color information extraction unit 40 extracts color information out of the image data stored in the image storage unit 20 by using the HSV color space, a sample color information extraction unit 50 extracts color information out of the sample image input at the sample image input unit 30 by using the HSV color space, and a contribution factors deciding unit 60 decides the contribution factors of hue H, chromaticity S, and luminance V of color data in the HSV color space. Unit 70 is a candidate image deciding unit to decide the searched candidate images by calculating the similarity, unit 80 is a control unit to control the entire apparatus in this embodiment, and unit 90 is a display unit which displays the searched candidate images.

Figure 2:
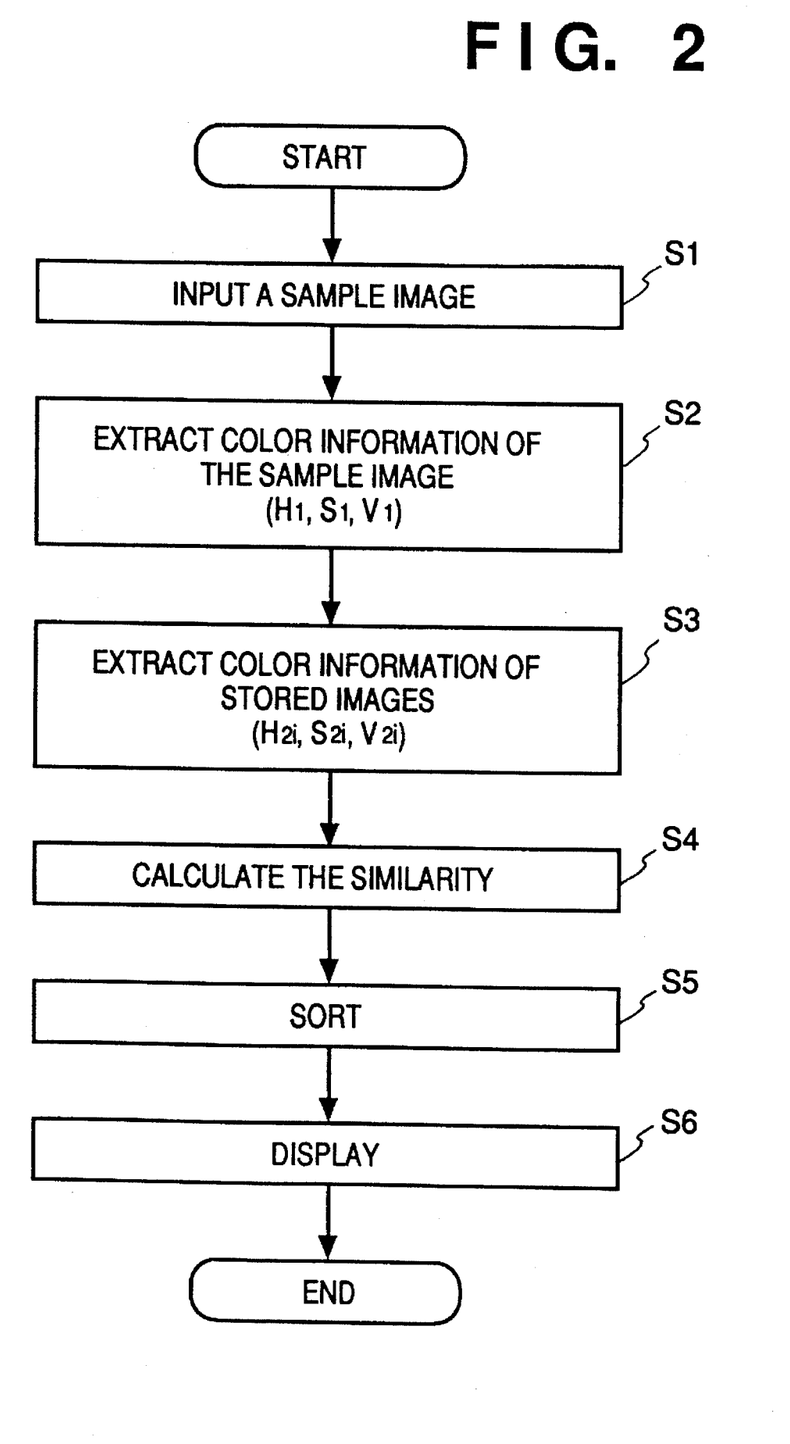
FIG. 2 is a flowchart of a searching processing sequence.

FIG. 2 is a flowchart of an image searching process performed by the apparatus in FIG. 1. An image searching process is explained below with reference to FIG. 2.

At step S1, a sample image of a desired image is made and input by the operator at the sample image input unit 30, and the sample image is transmitted to the control unit 80. The process of making the sample image is explained later in detail with reference to the flowchart in FIG. 3 and the illustration of the display in FIG. 4.

At step S2, the sample color information extraction unit 50 extracts the color information, namely, the values of the three attributes in the HSV color space, H1, S1, and V1, out of the input sample image.

At step S3, the image color information extraction unit 40 find a mode color in pixel units (the "mode" here is a term in statistics) in a designated portion of each image i (i=1,2, ... n: n is a total number of stored images) which is stored in the image storage unit 20, where the designated portion of each image i corresponds to the portion designated by the operator in the sample image, and the pixel mode color is defined as a representative value of the portion. Then each value of three attributes in the HSV color space, H2i, S2i, and V2i, are extracted.

It should be noted that in the aforementioned embodiment the representative value of the designated portion is defined by a mode color, however, it can be defined by a mean or a median in statistics, for instance.

At step S4, the similarity between the sample image and the stored images are calculated based on two different sets of the extracted color information, that is, (H1, S1, V1) and (H2i, S2i, V2i), and also on each contribution factor decided in the contribution factors deciding unit 60. This process is explained later in detail with reference to FIG. 5.

At step S5, the stored images are sorted in order of similarity in accordance with the similarity Ri (i=1,2,3, n). A stored image which has the higher similarity is considered as more similar image to the sample image than the others.

Note that the processes 4 and 5 are performed at the candidate image deciding unit 70.

At step 6, the sorted images are displayed in order of the degree of the similarity on the display unit 90.

Thus, the desired image is searched for from the stored images based on the color information of the sample image made by the operator by following the aforementioned procedure.

Figure 3:
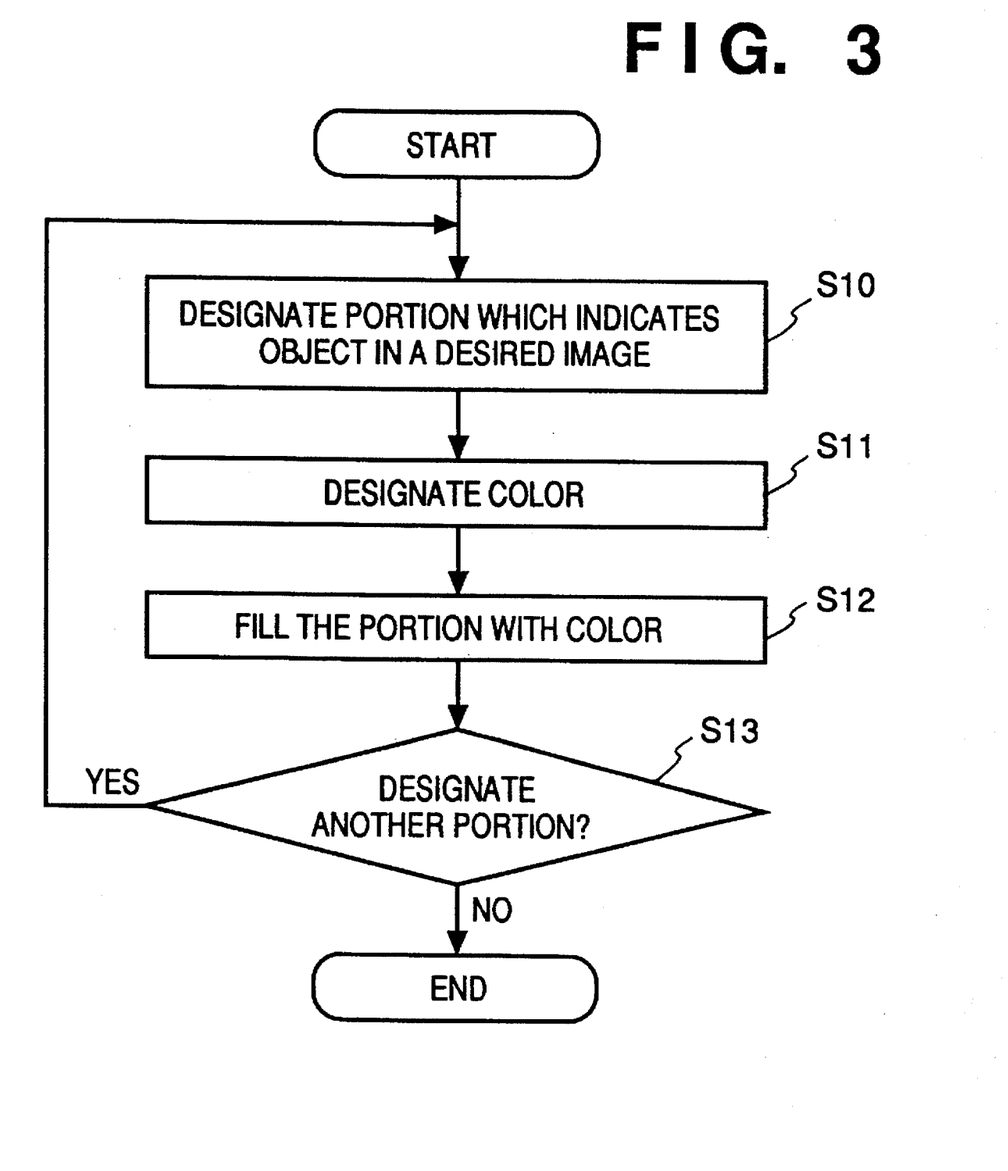
FIG. 3 is a flowchart showing a procedure for making a sample image.

Next, the sample image input process of step S2 is explained with reference to the flowchart of FIG. 3. The operator makes the sample image in a window which is open on the screen of the display unit 90 in the image processing apparatus by following the procedure shown in FIG. 3.

At step S10, the operator designates a portion which represents an object image in the desired image by the pointing input device 31.

Figure 4:
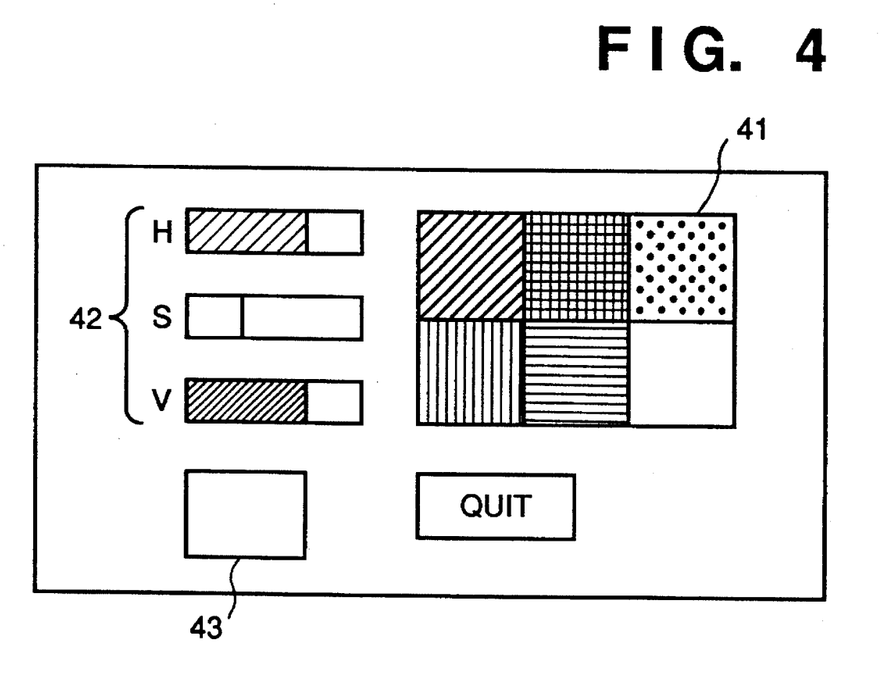
FIG. 4 illustrates a structure of a display for designating colors when making the sample image.

At step S11, a color is designated in the portion. An example of color designation by using the screen of the display unit 90 is illustrated in FIG. 4. Reference numeral 41 denotes six color chips including the three primary colors (red, green, blue) and the intermediate colors of the three primary colors (yellow, cyan, magenta), 42 denotes slide-bars to adjust each value of the HSV. The operator designates a color which is most similar to the color of portion by using the pointing input device 31. Then the indicated color is considered as standard, and each values of the HSV is adjusted so that the color becomes more similar to the color of the object in the desired image by moving the slide-bars with the pointing input device 31. The color under adjustment is displayed in a box 43 on the screen, so that the operator can see what shade of the color the operator designated. After the adjustment is finished, the color designation is completed by clicking a "quit" display using the pointing input device 31. Thus, the color of the portion of the sample image is decided.

At step S12, the portion which is selected at step S10 is filled with the color designated at step S11.

At step S13, the operator checks whether or not there is a need to designate another portion, and if not, the process of making the sample image is completed. Further, if another portion needs to be designated, the process returns to step 10, and the process described above is repeated.

Thus, the sample image is made by performing the aforementioned steps.

Figure 5:
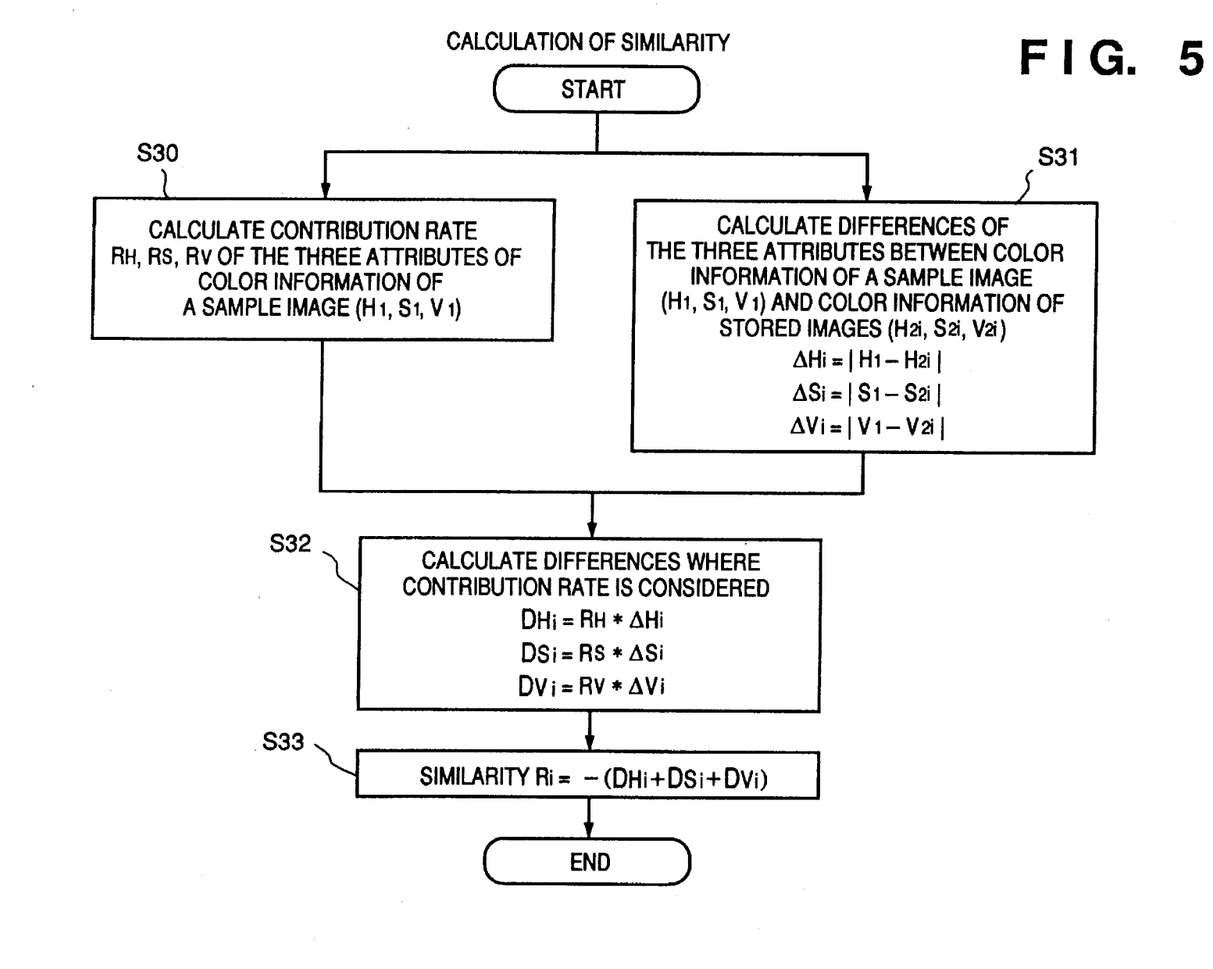
FIG. 5 is a flowchart showing a process to determine similarity.

Next, the process to obtain the respective similarity of step S4 between the sample image of step S2 and the stored images of step S3 is described in detail with reference to the flowchart in FIG. 5. Note that it is assumed that only one portion of the image is designated by the operator. In this process, the similarity is calculated based on the color information of the sample image (H1, S1, V1) and the color information of each stored image (H2i, S2i, V2i, where i=1, 2, 3, ... ,n: n is a total number of the stored images).

At step S30, first, each contribution factor, RH, RS, RV, for normalizing the three attributes of the color information of the sample image, H1, S1, and V1 is decided by using the contribution factors deciding unit 60. The process in the contribution factors deciding unit 60 is described later with reference to FIG. 6.

At step S31, the value differences of the three attributes between the color information of the sample image, H1, S1, and V1, and the color information of the stored images, H2i, S2i, and V2i, are calculated. The respective differences are described as, $\Delta Hi (\Delta Hi=|H1-H2i|)$, $\Delta Si(\Delta Si=|S1-S2i|)$, and $\Delta Vi$ ($\Delta Vi=|V1-V2i|$), where i=1, 2, 3, ... ,n: where n is the total number of stored images.

At step S32, color differences, in which the contribution factors are considered, $DHi(DHi=RH*\Delta hi)$, $DSi(DSi=$ RS*ΔSi), and Dvi(Dvi=RV*ΔVi), where i=1, 2, 3, ... ,n: n n: n is the total number of the stored images, are calculated on the basis of RH, RS, and RV which are obtained at step S30, and of ΔHi, ΔSi, and ΔVi which are obtained at step S31.

At step S33, DHi, DSi, and DVi are added, and similarity Ri (i=1, 2, 3, ... , n: n is the total number of the stored images) is defined by the negative value of the result of the addition (−(DHi+DSi+DVi)). Likewise, similarity Ri(i=1, 2, 3, ... ,n) of the each stored image are calculated. In a case where a plurality of portion are designated, the similarity Rij (i=1, 2, 3, ... ,n:j=1, 2, 3, ... ,m: m is a total number of a portion.) are calculated for each image. Then a representative degree of similarity of each image is defined by, for instance, the total value of the degree of similarity relating the images, namely, the result of addition Ri=Ri1+Ri2+. . . +Rim.

Figure 6:
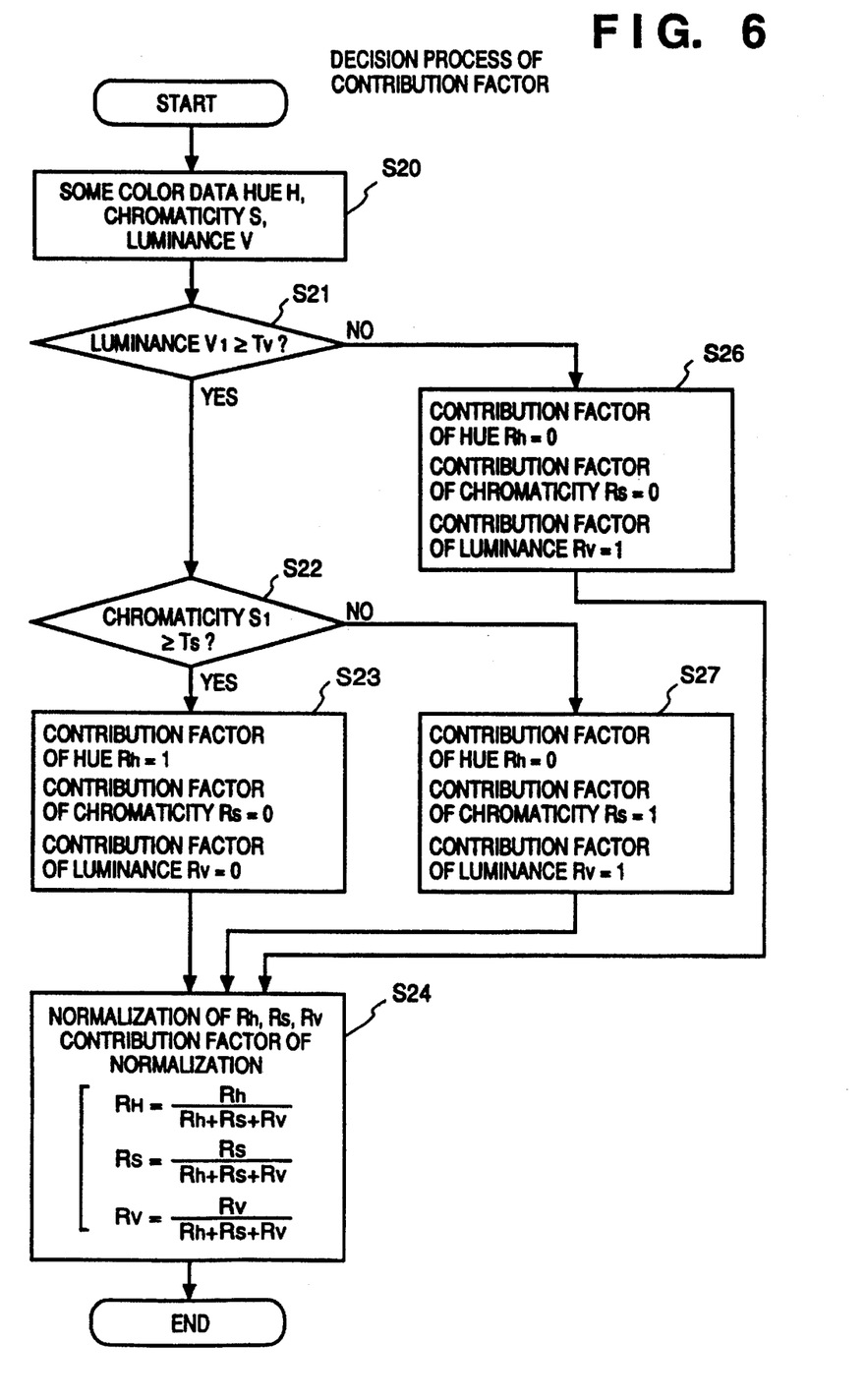
FIG. 6 is a flowchart showing a process for calculating each contribution factor of the three attributes of color data.

Next, the process to decide the contribution factor of step S30 is described below in detail with reference to a flowchart in FIG. 6. The flowchart shows the process performed by the contribution factors deciding unit 60.

Note that each contribution factor of the three attributes is denoted by RH, RS and RV, and each of the factors ranges from 0.0 to 1.0. Further, the normalized values of the three attributes, that is the normalized contribution factor, are denoted by RH, RS and RV. Values of the normalized contribution factors, which are output from the contribution factors deciding unit 60, are RH, RS and RV which are obtained after the normalization process described below.

At step S20, the color information of the sample image which is extracted at step S2 in FIG. 2 is input to the contribution factors deciding unit 60 from the sample image input unit 30 via the control unit 80.

At step S21, the color information of the sample image which is read at step S20 is examined, as to whether or not the luminance V1 is low, more specifically, whether or not the value of the luminance V1 is greater or equal to a predetermined threshold Tv. If the value of luminance V1 is less than the threshold Tv, the process proceeds to step S26 and the contribution factors of hue H, chromaticity S, and luminance V are assigned as Rh=0, Rs=0, and Rv=1, respectively. In other words, the low luminance results in a low contribution factor of chromaticity. Then the process moves to step S24.

At step S24, since the contribution factors, Rh, Rs, and Rv are decided, these three values are normalized to obtain the normalized contribution factors RH, RS and RV. The following are the equations for the normalizing calculation:

$RH = Rh/(Rh+Rs+Rv)$ $RS = Rs/(Rh+Rs+Rv)$ $RV = Rv/(Rh+Rs+Rv)$

Next, at step S22, whether or not the chromaticity S1 is low is , more specifically, whether or not the value of the chromaticity S1 is greater or equal to a predetermined threshold Ts. If the value of chromaticity S1 is less than the threshold Ts, the process proceeds to step S27, and the contribution factors of hue H, chromaticity S, and luminance V are assigned as Rh=0, Rs=1, and Rv=1, respectively. Then the process moves to step S24. On the other hand, if the value of chromaticity S1 is larger than the threshold Ts, the process proceeds to step S23, and contribution factors of hue H, chromaticity S, and luminance V are assigned as Rh=1, Rs=0, and Rv=0, respectively. Then the process moves to step S24 to perform a normalizing procedure.

Thus, the normalized contribution factors of the three attributes, RH, RS and RV are decided by following the above described procedure.

As explained above, the desired image is searched for in of the stored images in accordance with the color information of the sample image as determined by the operator.

Note that as an example of a sample image input means, the image can be drawn on paper or the like, and read by a scanner instead of drawing the image on a display.

Further, various ways to designate a color of a portion during the process of making a sample image are as follows:

1. Choose a color out of a limited number of colors which are displayed on a screen,
2. Designate a color by using color chips, and input a discrimination number of the designated color chip, and
3. Input values of color data, such as RGB and HSV, in the form of a number.

Further, in a case where RGB color data is used as the sample image data, the RGB color data needs to be converted into HSV space data, since the image data in the image storage unit 20 is HSV space data. This conversion from the RGB data to the HSV data is performed by using the following conversion algorithm. The conversion algorithm is fully explained in *Fundamentals of Interactive Computer Graphics*(J. D. Foley, A. Vandam, pp613–620).

--- max = The maximum value of R, G, and B
min = The minimum value of R, G, and B
if(max ≠ 0)
    then S = (max−min)/max
    else S = 0
if S = 0 then H = undefined
else
    begin   rc = (max−R)/(max−min)
             gc = (max−G)/(max−min)
             bc = (max−B)/(max−min)
if(R = max) then
    H = bc−gc
else if(G = max) then
    H = 2+rc−bc
else if(B = max) then
    H = 4+gc−rc
if(H ≤ 0) then H = H+360
end

---

Note that in the first embodiment the HSV color space is employed as a color perception space which is defined by hue, chromaticity, and luminance. However, needless to say, it is possible to employ other color perception spaces, such as a Munsell color space.

As explained above, according to this embodiment, it is easier for an operator to search for a desired image in an image database by improving the quality of the search by using color information when searching for similar images to the desired image.

(Second Embodiment)

As a method for deciding contribution factors of the three attributes of color data in the first embodiment, thresholds Tv and Ts are predetermined to obtain the contribution factors. There is another method to determine the contribution factor by using predetermined membership functions. In a second embodiment, another example of the operation of the contribution factors deciding unit 60 is described.

Figure 7:
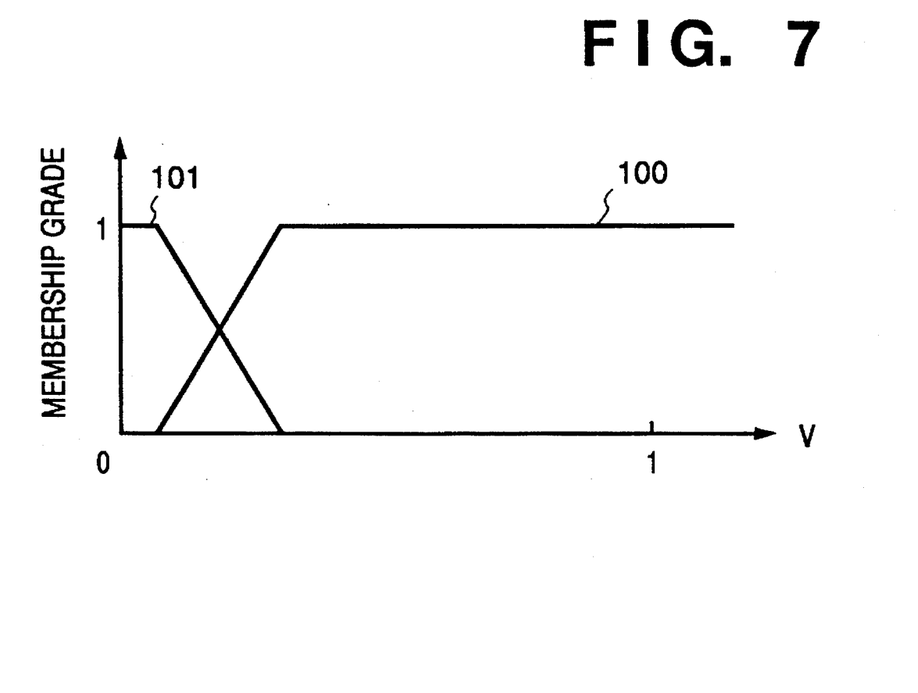
FIG. 7 illustrates a shape of a membership function of luminance.
Figure 8:
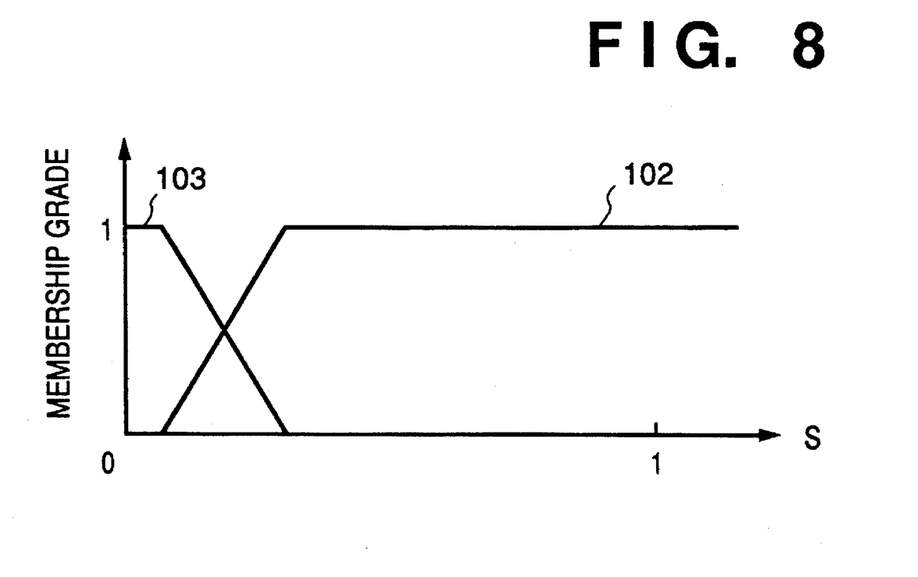
FIG. 8 illustrates a shape of a membership function of chromaticity.

FIGS. 7 and 8 are examples of the shapes of membership functions of luminance and chromaticity, respectively. In FIG. 7, a horizontal axis shows the value of luminance, and a vertical axis shows the membership grade of the corresponding luminance. Similarly, in FIG. 8, a horizontal axis shows the value of chromaticity, and a vertical axis shows the membership grade of the corresponding chromaticity. The membership functions in FIG. 7 illustrates a membership function 101 which indicates that the luminance is low, and a membership function 100 which indicates that the luminance is not low. Likewise, the membership functions in FIG. 8 illustrates two membership functions 103 and 102, which indicates that the chromaticity is low, and that the chromaticity is not low, respectively. The membership functions 101 and 100 are denoted by Mlv(i) and Mhv(i), respectively, hereinafter. Regarding i in the parenthesis, it indicates luminance. Further, Mlv(i) and Mhv(i) are the membership grades relating to the luminance i. In the same manner, the membership functions 103 and 102 are denoted by Mls(j) and Mhs(j), respectively, hereinafter. Regarding j in the parenthesis, it indicates chromaticity. Therefore, Mls(j) and Mhs(j) are the membership grades relating to the chromaticity j.

Figure 9:
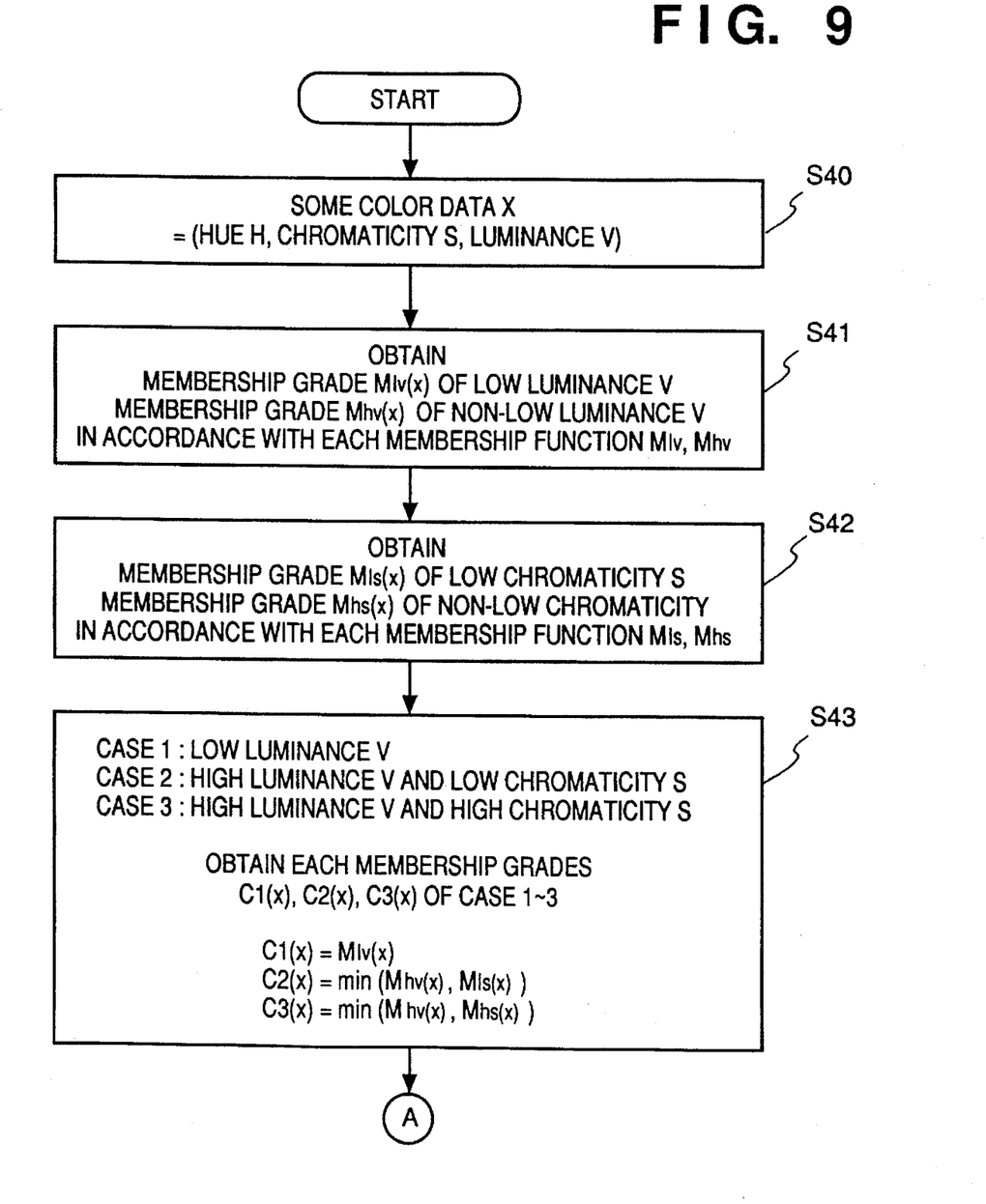
FIG. 9 is a flowchart showing a process for calculating the contribution factor using the membership functions.

The process for deciding contribution factors of the three attributes of color data is explained below with reference to FIGS. 9 and 10. Here, contribution factors (i.e., RH, RS and RV) of color data X(H1, S1, V1) of a sample image illustrated by using the HSV color space, RH, RS and RV are calculated by using membership functions. The followings are the processes at each step.

At step S40, color information of a sample image (H1, S1, V1) which is extracted at step S2 in FIG. 2, is input to the contribution factors deciding unit 60 from the sample image input unit 30 via the control unit 80.

At step S41, membership grades, Mlv(V1) and Mhv(V1) which correspond to luminance V1, are obtained by using the membership functions 101 and 100 in FIG. 7.

At step S42, membership grades, Mls(S1) and Mhv(S1) corresponding to chromaticity S1, are obtained by referring to the membership functions 103 and 102 in FIG. 8.

At step S43, the contribution factors, C1(x), C2(x), and C3(x) corresponding to three cases of the color data x are obtained based on the respective membership grades which are obtained at steps S41 and S42, where the three cases are case 1 (low luminance V), case 2 (high luminance V and low chromaticity S), and case 3 (high luminance V and high chromaticity S). The values of C1(x), C2(x) and C3(x) are given by the following equations:

$$C1(X)=Mlv(V1)$$

$$C2(X)=\min(Mhv(V1), Mls(S1))$$

$$C3(X)=\min(Mhv(V1), Mhs(S1))$$

Figure 10:
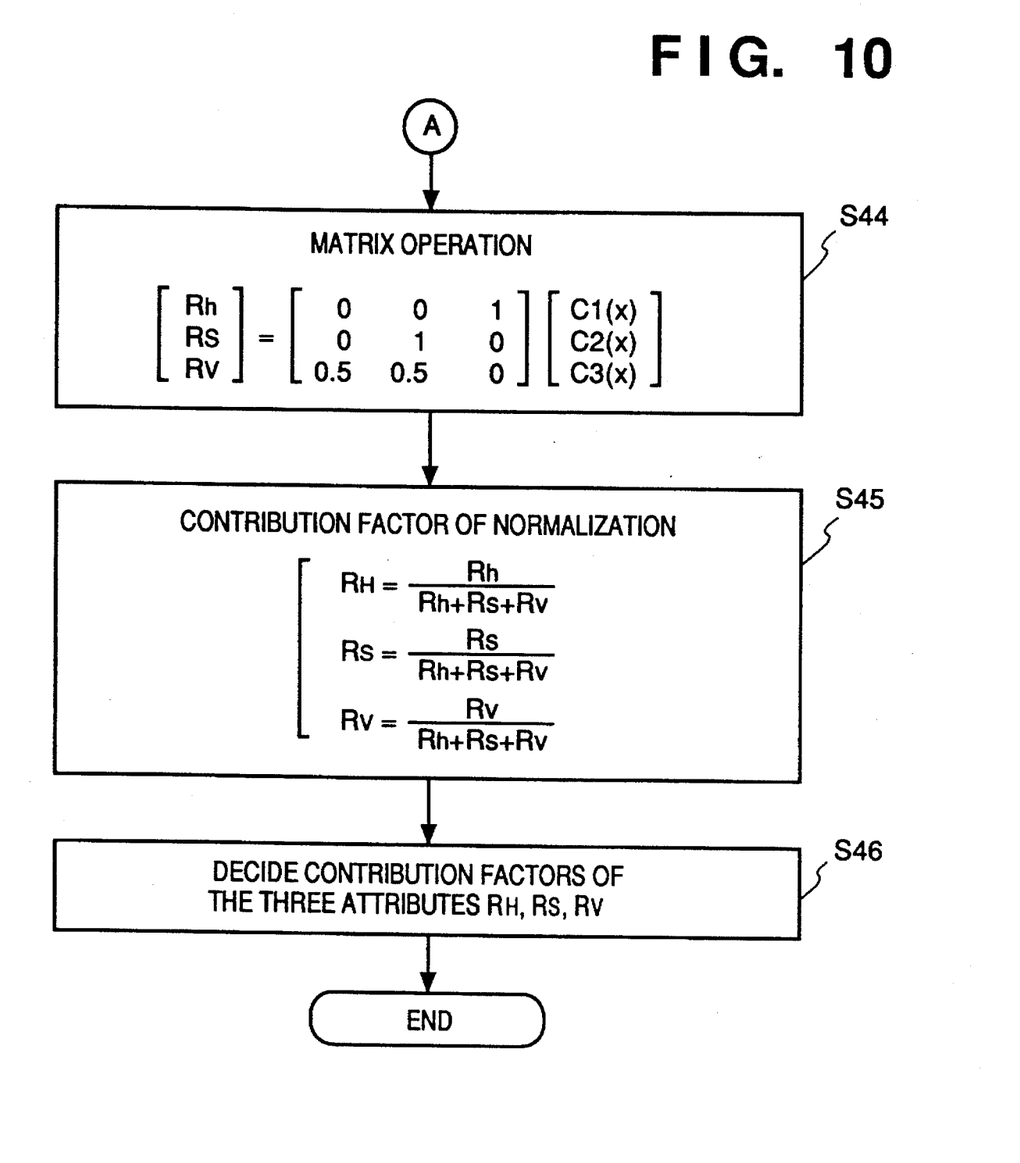
FIG. 10 is a flowchart showing another process of calculating the contribution factor using the membership functions.

At step S44, the contribution factors of the three attributes of colors, Rh, Rs and Rv are obtained by performing a matrix operation represented by S44 in FIG. 10.

At step S45, these three values are normalized, and the normalized contribution factors RH, RS and RV are obtained. The normalized contribution factors are given by the following equations:

$$RH=Rh/(Rh+Rs+Rv)$$

$$RS=Rs/(Rh+Rs+Rv)$$

$$RV=Rv/(Rh+Rs+Rv)$$

The present invention can be applied to a system constituted by a plurality of devices, or to an apparatus comprising a single device. Furthermore, the invention is also applicable to a case where the object of the invention is attained by supplying a program to a system or apparatus.

As described above, according to this embodiment, the contribution factor of an image color component of better quality is obtained by using the membership functions, such that performance of the image search is enhanced.

Furthermore, according to the embodiments of the invention the quality of search using color information is improved when an image is searched from an image database.

As many apparently widely different embodiments of the present invention can be made without departing from the spirit and scope thereof, it is to be understood that the invention is not limited to the specific embodiments thereof except as defined in the appended claims.

What is claimed is:

1. A computer-implemented image searching method of searching for a desired image in an image database which stores a plurality of images each having predetermined color information signals containing a plurality of color components, by using an input color information signal containing a plurality of color components, comprising:

an image searching computer-implemented first step of calculating a contribution factor of each color component of color information on the basis of the input color information signals;

an image searching computer-implemented second step of calculating a similarity between the input color information signal and the plurality of predetermined color information signals based on said contribution factor of each color component of the color information signals, as calculated at said image searching computer-implemented first step; and an image searching computer-implemented third step of sorting said plurality of predetermined color information signals based on an order of similarity as calculated at said image searching computer-implemented second step, and of displaying the sorted predetermined color information signals on a display means; and an image searching computer-implemental fourth step of selecting one of the displayed sorted predetermined color information signals as the desired image.

2. The image searching method according to claim 1, wherein said each color component of color information is hue, chromaticity, and luminance.

3. The image searching method according to claim 1, wherein, at said image searching computer-implemented first step, the contribution factor of each color component of color information is calculated based on the comparison between each color component of the input color information and a predetermined threshold for each color.

4. The image searching method according to claim 2, wherein at said image searching computer-implemented first step, if luminance of said input color information is lower than a predetermined threshold, then a contribution factor corresponding to the luminance is set to be high, and wherein if the luminance is higher and chromaticity of the input color information is higher than the predetermined thresholds, then a contribution factor corresponding to hue is set to be high, further wherein if the luminance of said input color information is higher and the chromaticity of said input color information is lower than the predetermined thresholds, then the contribution factor of the chromaticity of the input color information and the contribution factor of the luminance of the input color information are set to be high.

5. The image searching method according to claim 2, wherein, at said image searching computer-implemented first step, the calculation is performed based on a plurality of membership functions which show membership grades of chromaticity and luminance of the input color information.

6. The image searching method according to claim 1, wherein the input color information is generated at an image searching computer-implemented fourth step of generating color information.

7. A computer-implemented image searching method of searching for a desired image in an image database which stores a plurality of images by using color information signals, comprising:

an image searching computer-implemented first step of generating a sample image including color information signals;

an image searching computer-implemented second step of calculating contribution factors of color information based on the color information signals of the sample image generated at said image searching computer-implemented first step;

an image searching computer-implemented third step of calculating similarity between the sample image and the plurality of images stored in said image database, based on the contribution factors calculated at said image searching computer-implemented second step;

an image searching computer-implemented fourth step of displaying the plurality of images from said image database on a display means in an order of the similarity; and an image searching computer-implemented fourth step of selecting one of the displayed images as the desired image.

8. The image searching method according to claim 7, wherein color components of said color information are hue, chromaticity, and luminance.

9. The image searching method according to claim 8, wherein, at said image searching computer-implemented second step, the contribution factors corresponding to said color components of the color information of the sample image are calculated based on a comparison between said color components of the color information of the sample image and predetermined thresholds.

10. The image searching method according to claim 8, wherein, at said image searching computer-implemented second step, if luminance of the color information is lower than a predetermined threshold, then the luminance is set to be high, and wherein if the luminance is higher and chromaticity of the color information is higher than the predetermined thresholds, then the contribution factor corresponding to hue of the color information is set to be high, further wherein if the luminance of said color information is higher and the chromaticity of the color information is lower than the predetermined thresholds, then the contribution factor of the chromaticity of the color information and the contribution factor of the luminance of the color information are set to be high.

11. The image searching method according to claim 8, wherein, at said image searching computer-implemented second step, the calculation is performed based on a plurality of membership functions which show membership grades of chromaticity and luminance of the color information.

12. An image searching apparatus for searching for a desired image in an image database which stores a plurality of images each having predetermined signals containing a plurality of color components by using an input color information signal containing a plurality of color components, comprising:

contribution factor calculation means for calculating a contribution factor of each color component of color information on the basis of the input color information signal;

similarity calculations means for calculating similarity between the input color information signal and the plurality of predetermined color information signals based on said contribution factor of each color component of the color information signals as calculated by the contribution factor calculation means; and displaying means for sorting said plurality of predetermined color information signals based on an order of similarity as calculated by said similarity calculation means, and of displaying the sorted predetermined color information on a display means; and selection means for selecting one of the displayed sorted predetermined color information signals as the desired image.

13. The image searching apparatus according to claim 12, wherein said each color component of color information is hue, chromaticity, and luminance.

14. The image searching method according to claim 12, wherein said contribution factor calculation means calculates the contribution factor corresponding to said each color component of color information based on the comparison between said each color component of color information and a predetermined threshold for each color.

15. The image searching apparatus according to claim 13, wherein said contribution factor calculation means sets a contribution factor corresponding to the luminance to be high, if luminance of said input color information is lower than a predetermined threshold, and wherein a contribution factor corresponding to hue is set to be high, if the luminance is higher and chromaticity of the input color information is higher than the predetermined thresholds, further wherein the contribution factor of the chromaticity of the input color information and the contribution factor of the luminance of the input color information is set to be high, if the luminance of said input color information is higher and the chromaticity of said input color information is lower than the predetermined thresholds.

16. The image searching apparatus according to claim 13, wherein said contribution factor calculation method calculates based on a plurality of membership functions which show membership grades of chromaticity and luminance of the input color information.

17. The image searching apparatus according to claim 12, wherein the input color information is generated by a color information generating means.

18. An image searching apparatus for searching for a desired image in an image database which stores a plurality of images by using color information, comprising:

generating means for generating a sample image including color information signal;

contribution factor calculation means for calculating contribution factors of color information based on the color information signals of the sample image generated by said generating means;

similarity calculation means for calculating similarity between the sample image generated by said generating means and the plurality of images stored in said image database, based on the contribution factors;

displaying means for displaying the plurality of images from said image database on a display means in an order of the similarity; and selection means for selecting one of the displayed images as the desired image.

19. The image searching apparatus according to claim 18, wherein color components of said color information are hue, chromaticity, and luminance.

20. The image searching apparatus according to claim 18, wherein said contribution factor calculation means calculates the contribution factors corresponding to said color components of the color information of the sample image based on a comparison between said color components of the color information of the sample image and predetermined thresholds.

21. The image searching apparatus according to claim 19, wherein said contribution factor calculation means sets the luminance to the high, if luminance of the color information is lower than a predetermined threshold, and wherein the contribution factor corresponding to hue of the color information is set to be high, if the luminance is higher and chromaticity of the color information is higher than the predetermined thresholds, further wherein the contribution factor of the chromaticity of the color information and the contribution factor of the luminance of the color information is set to be high, if the luminance of said color information is higher and the chromaticity of the color information is lower than the predetermined thresholds.

22. The image searching apparatus according to claim 19, wherein said contribution factor calculation means calculates based on a plurality of membership functions which show membership grades of chromaticity and luminance of the color information.

* * * * *

UNITED STATES PATENT AND TRADEMARK OFFICE
CERTIFICATE OF CORRECTION

PATENT NO. : 5,586,197
DATED : December 17, 1996
INVENTOR(S) : KAZUKO TSUJIMURA ET AL.

It is certified that error appears in the above-indentified patent and that said Letters Patent is hereby corrected as shown below:

COLUMN 3

Line 45, "find" should read --finds--.

COLUMN 4

Line 25, "values" should read --value--;
Line 63, "$\Delta Si(\Delta Si=| S_1-S2i)$," should read --$\Delta Si(\Delta Si=|S1-S2i|)$,--.

COLUMN 5

Line 2, "n:n" should be deleted;
Line 11, "portion" should read --portions--;
Line 13, "portion.)" should read --portion)--;
Line 37, "greater" should read --greater than--;
Line 56, "is," should read --is examined,--;
Line 57, "greater" should read --greater than--.

UNITED STATES PATENT AND TRADEMARK OFFICE
CERTIFICATE OF CORRECTION

PATENT NO. : 5,586,197
DATED : December 17, 1996
INVENTOR(S) : KAZUKO TSUJIMURA ET AL.

Page 2 of 2

It is certified that error appears in the above-indentified patent and that said Letters Patent is hereby corrected as shown below:

COLUMN 6

Line 5, "of" should be deleted--.

COLUMN 7

Line 22, "followings" should read --following--.

COLUMN 10

Line 55, "signal;" should read --signals;--.

COLUMN 11

Line 15, "the high," should read --be high,--.

Signed and Sealed this

Tenth Day of June, 1997

Attest:

BRUCE LEHMAN

Attesting Officer

Commissioner of Patents and Trademarks